United States Patent
Palazzo et al.

(10) Patent No.: US 12,199,931 B2
(45) Date of Patent: Jan. 14, 2025

(54) APPARATUSES AND METHODS FOR MONITORING AND MANAGING MESSAGES AND MESSAGING CONTENT

(71) Applicant: AT&T Intellectual Property I, L.P., Atlanta, GA (US)

(72) Inventors: Richard Palazzo, Stewartsville, NJ (US); Ari Craine, Marietta, GA (US); Rashmi Palamadai, Naperville, IL (US); Eric Zavesky, Austin, TX (US); Oliver Spatscheck, Denison, TX (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/060,980

(22) Filed: Dec. 2, 2022

(65) Prior Publication Data

US 2024/0187363 A1 Jun. 6, 2024

(51) Int. Cl.
*H04L 51/21* (2022.01)
*H04L 51/046* (2022.01)
*H04L 51/063* (2022.01)

(52) U.S. Cl.
CPC ............ *H04L 51/21* (2022.05); *H04L 51/046* (2013.01); *H04L 51/063* (2013.01)

(58) Field of Classification Search
CPC ...... G06F 40/20; G06F 40/232; G06F 40/253; G06F 40/30; H04L 51/00; H04L 51/02; H04L 51/04; H04L 51/046; H04L 51/063; H04L 51/21; H04L 51/212; H04L 51/52; H04L 51/56; H04L 67/306
See application file for complete search history.

(56) References Cited

U.S. PATENT DOCUMENTS

| 10,382,379 | B1* | 8/2019 | Zhang | G06F 40/30 |
| 10,922,483 | B1* | 2/2021 | Shevchenko | H04L 51/046 |
| 11,068,654 | B2* | 7/2021 | Beller | G06F 40/30 |
| 11,444,896 | B1* | 9/2022 | Kwon | H04L 51/06 |
| 2004/0001090 | A1* | 1/2004 | Brown | G06Q 10/107 |
| | | | | 715/752 |
| 2010/0082751 | A1* | 4/2010 | Meijer | G06Q 10/107 |
| | | | | 709/206 |

(Continued)

OTHER PUBLICATIONS

Anonymous, "Cultural Translation and Recommendation for Electronic Correspondence", IP.com Prior Art Database, Nov. 19, 2021 (Year: 2021).*

*Primary Examiner* — Vivek Srivastava
*Assistant Examiner* — William C McBeth
(74) *Attorney, Agent, or Firm* — Guntin & Gust, PLC; Mark Wilinski

(57) ABSTRACT

Aspects of the subject disclosure may include, for example, identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. Other embodiments are disclosed.

20 Claims, 7 Drawing Sheets

(56) References Cited

U.S. PATENT DOCUMENTS

| | | | | |
|---|---|---|---|---|
| 2010/0223341 A1* | 9/2010 | Manolescu | ............. | H04L 51/02 709/224 |
| 2010/0223581 A1* | 9/2010 | Manolescu | .......... | G06Q 10/107 707/E17.046 |
| 2014/0280551 A1* | 9/2014 | Byrd Vallieres de St. Real | ......... | G06Q 50/01 709/204 |
| 2014/0359022 A1* | 12/2014 | Buddenbaum | ........ | H04L 51/212 709/206 |
| 2015/0067486 A1* | 3/2015 | Hochman | ............. | G06F 40/232 715/257 |
| 2015/0278196 A1* | 10/2015 | Dua | ........................ | G06F 40/40 704/9 |
| 2016/0072756 A1* | 3/2016 | Aravkin | .................. | H04L 51/02 709/206 |
| 2016/0294746 A1* | 10/2016 | Boothroyd | ............ | H04L 51/063 |
| 2016/0294755 A1* | 10/2016 | Prabhu | .................. | H04L 51/212 |
| 2017/0052949 A1* | 2/2017 | Baldwin | ................ | H04L 51/212 |
| 2017/0085504 A1* | 3/2017 | Logan | ..................... | H04L 51/04 |
| 2018/0006979 A1* | 1/2018 | Barsness | ................. | H04L 51/04 |
| 2018/0176168 A1* | 6/2018 | Tsou | ..................... | H04L 51/212 |
| 2018/0331989 A1* | 11/2018 | Bastide | ................ | H04L 51/063 |
| 2018/0331990 A1* | 11/2018 | Bastide | ................ | H04L 51/046 |
| 2020/0053035 A1* | 2/2020 | Mukherjee | .............. | G06F 40/30 |
| 2020/0220828 A1* | 7/2020 | Kwatra | ................. | H04L 51/063 |
| 2020/0322299 A1* | 10/2020 | Kwatra | ................. | H04L 51/046 |
| 2020/0334639 A1* | 10/2020 | Ramakrishnan | ...... | H04L 51/214 |
| 2021/0303775 A1* | 9/2021 | Deleuze | ................. | G06F 40/30 |
| 2021/0326528 A1* | 10/2021 | Kemp | ................... | G06F 40/253 |
| 2021/0374335 A1* | 12/2021 | Adcock | ................. | G06F 40/30 |
| 2021/0397793 A1* | 12/2021 | Li | ........................ | G06F 40/253 |
| 2022/0329556 A1* | 10/2022 | Daga | .................... | H04L 51/212 |
| 2023/0055595 A1* | 2/2023 | Gaddam | ............... | H04L 51/212 |
| 2023/0421518 A1* | 12/2023 | Pandey | ................. | H04L 51/212 |

\* cited by examiner

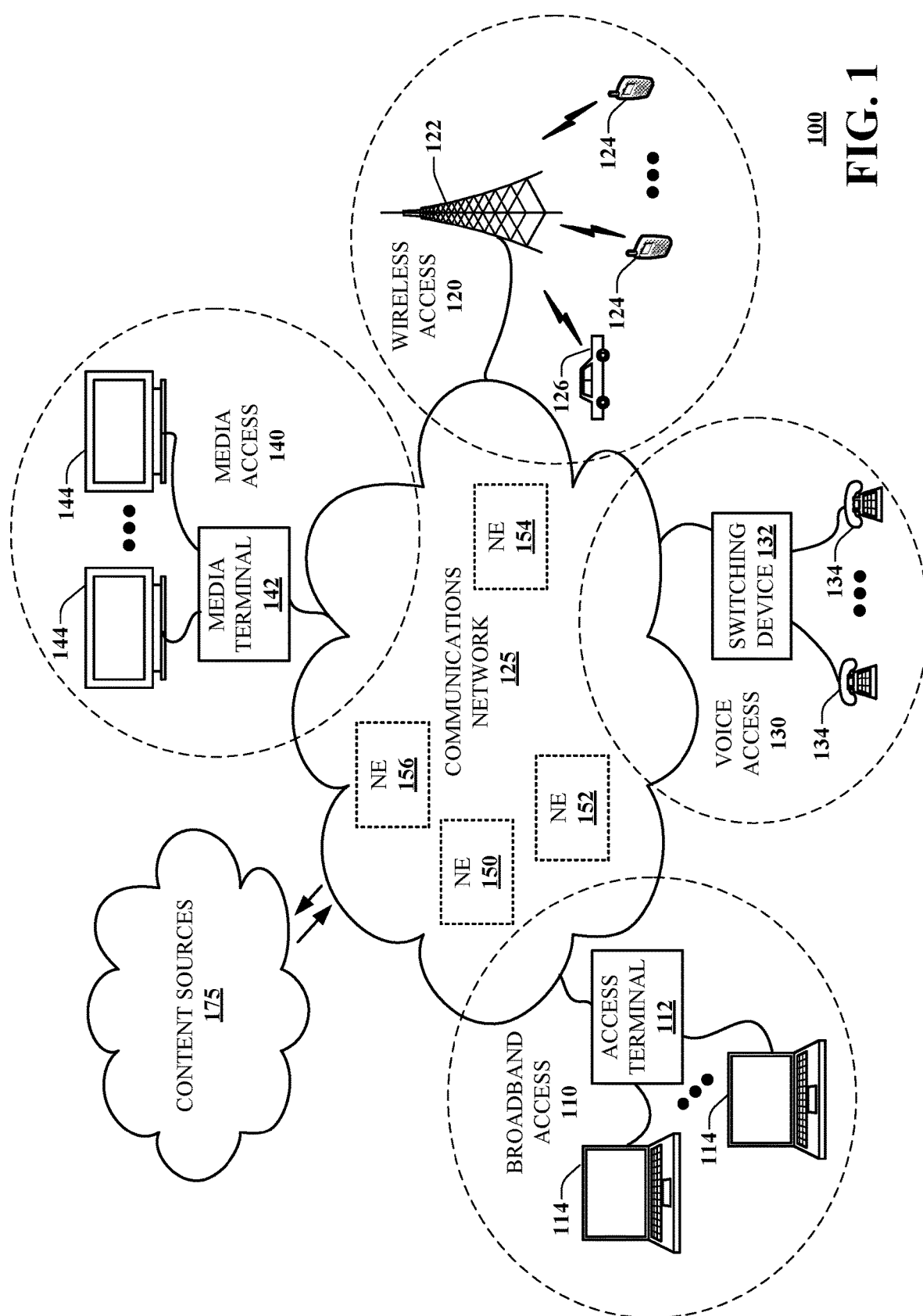

200a

300

600

APPARATUSES AND METHODS FOR MONITORING AND MANAGING MESSAGES AND MESSAGING CONTENT

FIELD OF THE DISCLOSURE

The subject disclosure relates to apparatuses and methods for monitoring and managing messages and messaging content.

BACKGROUND

As the world increasingly becomes connected via vast communication networks and systems and via various communication devices, additional opportunities are created/generated to provision communication services to the communication devices. Some communication devices are utilized by users to send or receive messages (e.g., audio or voice messages, video messages, text messages, email messages, and the like). Many people are busy in their day-to-day lives, and do not always have the time or intellectual ability/capacity to make appropriate judgments in formulating the contents of a message to be sent to one or more other parties/users.

Still further, even if the contents of a message composed by a first user might appear to be appropriate to a general/average user, a second user that is an intended recipient of the message may have her own idiosyncratic style or preferences that may depart from the style or preferences of the general/average user. In this respect, the contents of the message sent by the first user might be suboptimal (e.g., the contents may be ill-received by the second user).

As an additional layer/wrinkle of complexity, many communication devices feature a multitude of different applications (or "apps" for short) that may be utilized in obtaining services. A (content of a) message that is sent or received as part of a first app might not be appropriate in conjunction with a second app that is different from the first app.

Even if a message is successfully sent to a target recipient, the results of having sent that message are frequently unknown to the sender, which is to say that the environment/app that is used fails to provide detail or context. Conventionally, messaging apps will simply provide a status regarding whether the message was delivered or read by the recipient.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

DETAILED DESCRIPTION

Figure 2A:
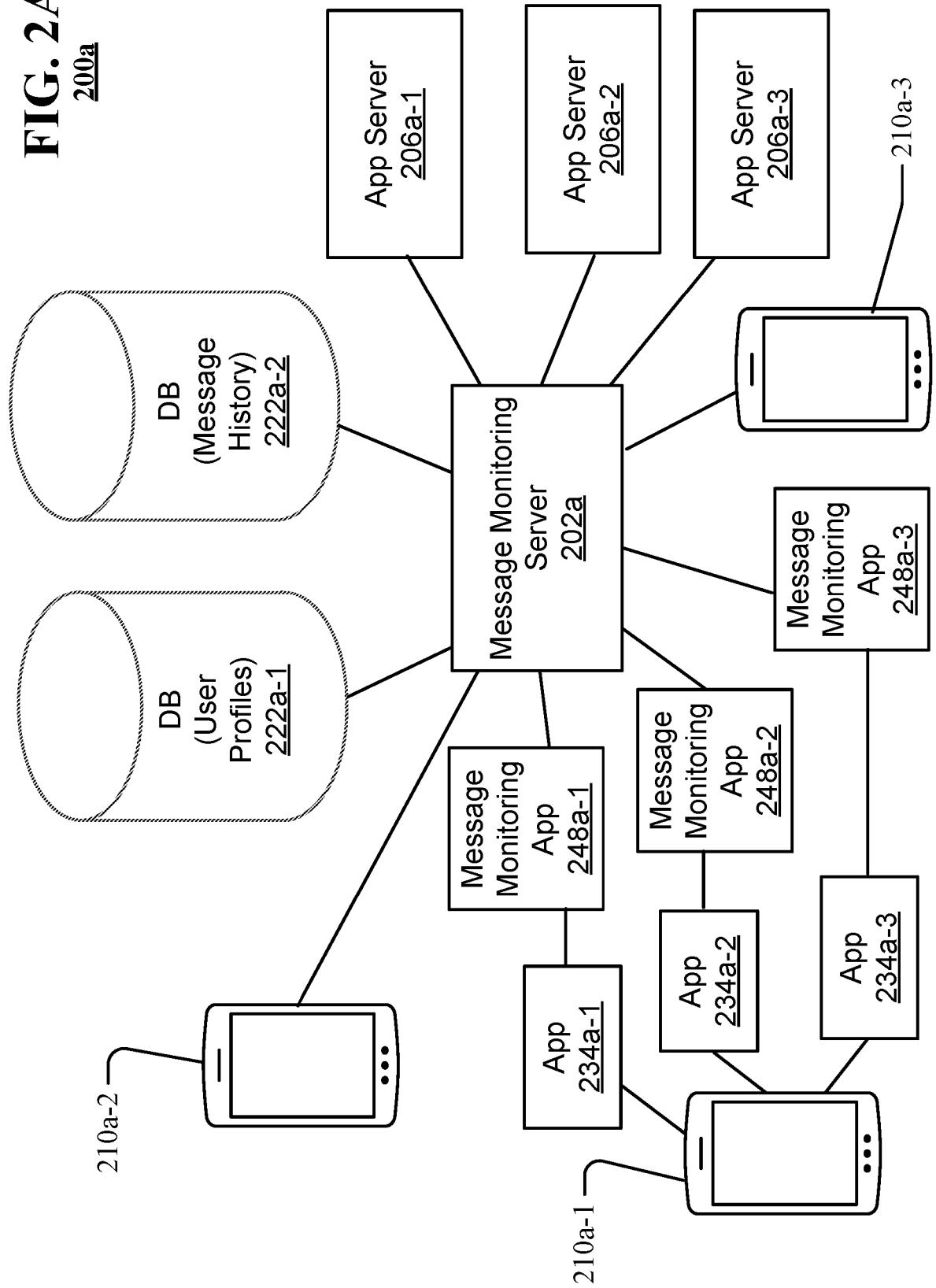
FIG. 2A is a block diagram illustrating an example, non-limiting embodiment of a system in accordance with various aspects described herein.

The subject disclosure describes, among other things, illustrative embodiments for monitoring messages and reactions/responses of user in respect of messages. Other embodiments are described in the subject disclosure.

One or more aspects of the subject disclosure include, in whole or in part, determining that a first user is composing a first message in a first application, the composing including a generation or an incorporation of first content; based on the determining, identifying a second user that is targeted as a recipient of the first message; obtaining, based on the identifying of the second user, first data pertaining to the second user; analyzing the first content relative to at least the first data; and providing, based on the analyzing, guidance to the first user.

One or more aspects of the subject disclosure include, in whole or in part, identifying a first message composed by a first user on a first user equipment that is directed to a second user of a second user equipment; identifying a preference of the second user; determining that a first content of the first message composed by the first user departs from the preference of the second user in an amount greater than a threshold; and providing, based on the determining, guidance to the first user for modifying the first content to generate second content that more closely aligns to the preference of the second user.

One or more aspects of the subject disclosure include, in whole or in part, determining, by a processing system including a processor, that a first user has requested a monitoring of messages sent via a first application, resulting in a first determination; determining, by the processing system, that the first user has composed a first message in the first application, resulting in a second determination; analyzing, by the processing system and based on the first determination and the second determination, a first content of the first message in accordance with a preference of a second user; providing, by the processing system and based on the analyzing, guidance to the first user via the first application; transmitting, by the processing system, the first message to the second user via the first application in accordance with the guidance; determining, by the processing system, that the first user has disabled a monitoring of messages sent via a second application that is different from the first application, resulting in a third determination; determining, by the processing system, that the first user has composed a second message in the second application, resulting in a fourth determination; and transmitting, by the processing system and based on the third determination and the fourth determination, the second message to the second user via the second application without providing guidance to the first user in the second application, wherein a second content of the second message is inconsistent with the preference of the second user.

Referring now to FIG. 1, a block diagram is shown illustrating an example, non-limiting embodiment of a system 100 in accordance with various aspects described herein. For example, the system 100 can facilitate in whole or in part determining that a first user is composing a first message in a first application, the composing including a generation or an incorporation of first content, based on the determining, identifying a second user that is targeted as a recipient of the first message, obtaining, based on the identifying of the second user, first data pertaining to the second user, analyzing the first content relative to at least the first data, and providing, based on the analyzing, guidance to the first user. The system 100 can facilitate in whole or in part identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. The system 100 can facilitate in whole or in part determining, by a processing system including a processor, that a first user has requested a monitoring of messages sent via a first application, resulting in a first determination, determining, by the processing system, that the first user has composed a first message in the first application, resulting in a second determination, analyzing, by the processing system and based on the first determination and the second determination, a first content of the first message in accordance with a preference of a second user, providing, by the processing system and based on the analyzing, guidance to the first user via the first application, transmitting, by the processing system, the first message to the second user via the first application in accordance with the guidance, determining, by the processing system, that the first user has disabled a monitoring of messages sent via a second application that is different from the first application, resulting in a third determination, determining, by the processing system, that the first user has composed a second message in the second application, resulting in a fourth determination, and transmitting, by the processing system and based on the third determination and the fourth determination, the second message to the second user via the second application without providing guidance to the first user in the second application, wherein a second content of the second message is inconsistent with the preference of the second user.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200a in accordance with various aspects described herein. In some embodiments, one or more portions of the system 200a may function within, or may be operatively overlaid upon, one or more portions of the system 100 of FIG. 1. The system 200a may include a number of devices or entities, such as for example a message monitoring server 202a, a first app server 206a-1, a second app server 206a-2, a third app server 206a-3, a first user equipment (UE) 210a-1, a second UE 210a-2, a third UE 210a-3, a first database (DB) 222a-1, and a second DB 222a-2. While shown separately, a first of the devices (e.g., the first DB 222a-1) may be combined with one or more of the other devices (e.g., the second DB 222a-2) within a common housing or casing. In this respect, no limitation is to be inferred or implied based on the arrangement of the devices specifically shown in FIG. 2A, which is to say that other forms or arrangements may be accommodated without departing from the scope and spirit of this disclosure.

The first UE 210*a*-1 may at least partially execute one or more apps in relation to one or more services. For example, the first UE 210*a*-1 may execute a first app 234*a*-1, a second app 234*a*-2, and a third app 234*a*-3. In an illustrative scenario, the first app 234*a*-1 may correspond to a virtual meeting app, the second app 234*a*-2 may correspond to a texting app, and the third app 234*a*-3 may correspond to a gaming (e.g., a virtual reality gaming app or an augmented reality gaming) app. The use of aforementioned three apps 234*a*-1 through 234*a*-3 is illustrative, which is to say that a different number/count of apps may be utilized or accommodated in some embodiments and/or the type/kind of apps that are supported may be different from what was just mentioned.

Each of the apps 234*a*-1 through 234*a*-3 may include a messaging feature that may be used to exchange messages between users. In this respect, a first user of the first UE 210*a*-1 may exchange a message with a second user of the second UE 210*a*-2 utilizing at least one of the apps 234*a*-1 through 234*a*-3. For example, the first user may compose a message on the first UE 210*a*-1 that may be transmitted to (and received by) the second UE 210*a*-2.

Each of the apps 234*a*-1 through 234*a*-3 may map to a respective one of the app servers 206*a*-1 through 206*a*-3. For example, the first app 234*a*-1 may map to the first app server 206*a*-1, the second app 234*a*-2 may map to the second app server 206*a*-2, and the third app 234*a*-3 may map to the third app server 206*a*-3. A mapping in this context may refer to an exchange or conveyance of data between the first UE 210*a*-1 and a respective one of the app servers 206*a*-1 through 206*a*-3 in relation to the respective app 234*a*-1 through 234*a*-3 to achieve/realize the functionality associated with the execution of the app.

The message monitoring server 202*a* may be interposed/disposed between the apps 234*a*-1 through 234*a*-3 and the app servers 206*a*-1 through 206*a*-3. Further, there may be an instance of a message monitoring app disposed between a respective one of the apps 234*a*-1 through 234*a*-3 and the message monitoring server 202*a*; e.g., a first messaging monitoring app 248*a*-1 may be disposed between the first app 234*a*-1 and the message monitoring server 202*a*, a second messaging monitoring app 248*a*-2 may be disposed between the second app 234*a*-2 and the message monitoring server 202*a*, and/or a third messaging monitoring app 248*a*-3 may be disposed between the third app 234*a*-3 and the message monitoring server 202*a*. While shown separately, in some embodiments two or more of the message monitoring apps 248*a*-1 through 248*a*-3 may correspond to a common message monitoring app. In some embodiments, one or more of the messaging monitoring apps 248*a*-1 through 248*a*-3 (e.g., the first message monitoring app 248*a*-1) may be separately configurable to interface to a respective one of the apps 234*a*-1 through 234*a*-3 (e.g., the first app 234*a*-1), which is to say that a message monitoring app may be adapted to meet the needs or requirements associated with a respective app that the message monitoring app interfaces to/with.

In some embodiments, the first user of the first UE 210*a*-1 may be provided with an option as to whether a message monitoring app (e.g., the first message monitoring app 248*a*-1) is to be used/enabled with respect to a given app (e.g., the first app 234*a*-1). If the first user elects to use the message monitoring app with the given app, the message monitoring app may open or establish a communication with the given app for purposes of receiving/intercepting any messages that are composed and sent by the first user within the given app. Thus, the message monitoring app (in conjunction with the message monitoring server 202*a*) may act as an intermediary for messages that may be sent by the first user using the given app on the first UE 210*a*-1.

A profile for the first user may be included or maintained by/at the first DB 222*a*-1. The profile for the first user may include indications of the elections/selections of whether message monitoring is to be provided with respect to each of the apps 234*a*-1 through 234*a*-3; the profile may include other data/information pertaining to the first user. Similarly, the first DB 222*a*-1 may store/include profiles for other users, such as for example the second user of the second UE 210*a*-2. A profile may be established or generated as part of a registration process. The registration process may be initiated upon downloading or installing an app on a device, updating an app on the device (such as, for example, as part of installing a newer or different version of the app), upon a request by a user, etc.

The second DB 222*a*-2 may store or save messages sent and received by users within the system 200*a* (potentially subject to an opt-in or opt-out option in order to respect potential user considerations/concerns regarding privacy). In this respect, the second DB 222*a*-2 may serve to maintain a catalog of a history of messages involving the users. The message monitoring server 202*a* may (potentially as part of a background task, potentially as part of a schedule (e.g., a periodic schedule), etc.) analyze the messages of the second DB 222*a*-2 to identify or derive patterns or trends. For example, the analysis performed by the message monitoring server 202*a* may serve to generate insight regarding how a (potential) recipient of a message tends to react to the content of messages (either in general, or from a specific user). To demonstrate by way of illustration, Table 1 shown below depicts three exemplary trends (labeled Trend 1, Trend 2, and Trend 3) for each of two users—a first named Bob and a second named Cathy—that might be potential targeted recipients of a message composed by another user (e.g., another user named Alexandria).

TABLE 1

Insights/Trends Identified Based On Message Analysis

| Recipient Name | Trend 1 | Trend 2 | Trend 3 |
|---|---|---|---|
| Bob | Responds negatively to criticism | Does not respond to texts after 18:00 hours | Trigger phrase that makes Peter upset: "can't be done" (or the like) |
| Cathy | Is slow to respond to text messages longer than 100 characters | Is inactive on texting between 12:00-14:00 hours | Often prefers phone calls relative to other forms of communication |

The nature or characteristics of the trends shown in Table 1 above are illustrative, which is to say that other types of insights or characteristics may be obtained or derived by the message monitoring server 202*a*. The results of the analysis performed by the message monitoring server 202*a* may be saved/stored as part of respective profiles for the recipients (Bob and Cathy in the example of Table 1) in the first DB 222*a*-1.

Continuing the above example, it may be assumed that Alexandria is using the first UE 210*a*-1 of FIG. 2A and Bob is using the second UE 210*a*-2 of FIG. 2A. Further, it may be assumed that Alexandria is composing/preparing a message on the first UE 210a-1 that is to be sent to Bob/the second UE 210a-2 via the first app 234a-1. Moreover, it may be assumed that the first message monitoring app 248a-1 has been enabled, such that messages sent by Alexandria via the first app 234a-1 are subject to monitoring by, e.g., the first message monitoring app 248a-1 (and the message monitoring server 202a). Thus, as Alexandria is preparing the message to be sent to Bob, Alexandria may intend to indicate to Bob that Alexandria does not like the way that another user (e.g., David) is presenting an idea that he came up with. For example, Alexandria may type a message on the first UE 210a-1 (via the first app 234a-1) that states "Bob—the way David is presenting his idea is poor. David would be much better off if he focused on feature #1, as opposed to spending so much time discussing feature #2 that is largely irrelevant in the big picture." The first message monitoring app 248a-1 may access the profile associated with Bob from the first DB 222a-1 (potentially by way of the message monitoring server 202a) and determine that Bob responds negatively to criticism (as shown in Table 1 above). The first message monitoring app 248a-1 may determine (based on natural language processing logic, algorithms, or the like) that the message Alexandria is typing tends to convey a negative thought or impression and may flag the message within an environment of the first app 234a-1 on the first UE 210a-1 due to Bob's apparent heightened sensitivities to criticism. The flag may be presented within the first app 234a-1 as its own message, an alert, a warning, or the like. In some embodiments, the flag may be accompanied by a recommendation for modifying some or all of the content of the message that is being composed/prepared by Alexandria. To illustrate, the recommendation may state something to the effect: rather than stating what you are typing, we believe Bob would respond better if the message said: "David is doing a good job presenting his idea. David's presentation would be even better if he emphasized feature #1 as it is core to his idea relative to feature #2." The recommendation may include an identification of the reasons why the recommendation is being provided—e.g., the recommendation may include an indication that Bob responds negatively to criticism. Alexandria may be given an option to reject the recommendation and/or an option to incorporate some or all of the recommendation into her message to Bob (while potentially being given an option to modify or delete all of the message Alexandria was initially composing/preparing). Thus, as this example demonstrates, aspects of this disclosure may facilitate a pre-delivery monitoring of messages, such that the effectiveness of the content of the messages may be enhanced relative to preferences or characteristics of target recipients of the messages.

In some embodiments, a post-delivery monitoring of messages may be provided or included. To demonstrate, and continuing the above example of Alexandria sending a message to Bob by way of the first app 234a-1, monitoring provided by, e.g., the message monitoring server 202a, the first message monitoring app 248a-1, or other device or entity, may identify or determine a reaction on the part of Bob after Bob reviews the content of the message. For example, features pertaining to Bob's tone of voice, Bob's facial expressions or body posture/body language, an action or lack of action on Bob's part (potentially relative to a timeout or threshold), etc., which may be obtained by one or more peripherals or devices (e.g., a camera, a microphone, etc.), may be analyzed to decipher or interpret Bob's reaction to the message sent by Alexandria. An indication of Bob's reaction to the message may be sent to Alexandria, such that Alexandria may better understand how Bob received the message and be better positioned in the future to compose/prepare messages that may be more favorably received or acted upon by Bob. In some embodiments, Bob's post-delivery reaction to Alexandria's message may be saved/stored as part of Bob's profile in the first DB 222a-1 to assist Alexandria (or another user) in composing messages directed to Bob in the future in a manner similar to what is described above.

In another example, it may be assumed that Alexandria sends a message to the third UE 210a-3 that belongs to Cathy. For example, the message that Alexandria sends to Cathy may be composed by Alexandria via the second app 234a-2 on the first UE 210a-1 (the third UE 210a-3 may have an instance of the second app 234a-2 installed thereon). As described above, conventionally if Alexandria sends the message to Cathy, Alexandria may, at most, obtain via the first UE 210a-1/second app 234a-2 a notification that the message was delivered to the third UE 210a-3 and/or opened/read at the third UE 210a-3. However, knowing whether a message is delivered or opened/read may be insufficient context for Alexandria to act appropriately. For example, it may be possible that the message Alexandria sends to Cathy is urgent in nature (e.g., relates to a deadline), such that Alexandria may need or desire additional context in the event that Cathy is slow to respond to the message. In this respect, aspects of this disclosure may provide Alexandria/the first UE 210a-1 with additional status, such as for example an indication that Cathy has been inactive/idle in respect of the third UE 210a-3 (or in respect of the instance of the second app installed thereon) for a specified amount of time. In this manner, if Cathy has been inactive/idle, Alexandria may begin to prepare to take actions operating under an assumption that Cathy might not act on the message in time (e.g., in advance of the deadline). In the event that Cathy does become active (either on the device 210a-3 in general or in respect of the instance of the second app installed thereon), the status that Alexandria obtains may be updated/modified to include an indication that Cathy is (now) active. Timestamps may be used to keep a running log of when a given status was determined.

As yet another example involving post-delivery monitoring and status, the third UE 210a-3 (or the instance of the second app installed thereon) may provide an indication of a position in a queue that Alexandria's message occupies. For example, it may be the case that Cathy has a large network of contacts that message her during the day using the second app, such that it may take Cathy a considerable amount of time to get to any particular message, such as Alexandria's message to Cathy, in the second app. Conveying a status of a position (on an absolute or relative basis) where Alexandria's message sits in a stack-up of messages to be reviewed by Cathy may provide insight to Alexandria regarding a likelihood of whether and/or when Cathy might be able to respond to Alexandria's message. The status of the position may be conveyed to the first UE 202a-1 (via the second app 234a-2) so that Alexandria can review and obtain such an understanding. The status may be updated over time so that Alexandria can obtain a current perspective/appreciation as to how quickly the backlog of messages in Cathy's queue is being processed or turned around.

In another illustrative embodiment, it may be assumed that Alexandria is utilizing the third app 234a-3 on the first UE 210a-1 to partake in a multi-player online (MPO) video game in a virtual environment. During the playing of the video game, Alexandria may be expected to participate according to a set of rules that may be defined or maintained by the third app server 206a-3, and any messages that Alexandria may prepare while playing the video game may be monitored by, e.g., the third message monitoring app 248a-3 in a manner similar to what is described above. Upon concluding her participation in the video game, Alexandria may exit from the third app 234a-3 and may open the first app 234a-1 on the first UE 210a-1 just in time to partake in an important business conference facilitated via the first app 234a-1. The abrupt change in apps (e.g., from the third app 234a-3 to the first app 234a-1) may cause some delay on Alexandria's part in terms of her adapting her mindset or thought processes from the gaming environment to the business conference environment. It may be the case that in the gaming environment rude or crass behavior/language is not only tolerated but expected, whereas in the business conference environment such rude or crass behavior/language might not only be frowned upon but could potentially subject Alexandria to disciplinary action (up to an including termination). In this respect, one or more devices or entities (such as, for example, the message monitoring server 202a) of FIG. 2A may detect the change in apps/environments and may provide a notification or warning to Alexandria (via, e.g., the first app 234a-1) that Alexandria is expected to conform her behavior or the content of her messages to the rules/norms of the conferencing environment (as potentially stored or maintained by/at the first app server 206a-1). Of course, the converse could apply, where Alexandria may be encouraged (via, e.g., the third app 234a-3) by the message monitoring server 202a to use more salty language in her messages upon entering/opening the third app 234a-3 in order to enhance the entertainment value for other players/participants in the gaming environment.

As the foregoing examples demonstrate, aspects of this disclosure may serve to modify, filter, or enhance the content of messages or behaviors undertaken by the part of users as part of one or more applications or environments. Machine learning and/or artificial intelligence technologies may be utilized to obtain insight as to how messages or behaviors are received or acted upon by users. Such insight may be used to adapt future messages or behaviors, thereby enhancing the effectiveness of future messages or behaviors.

Figure 2B:
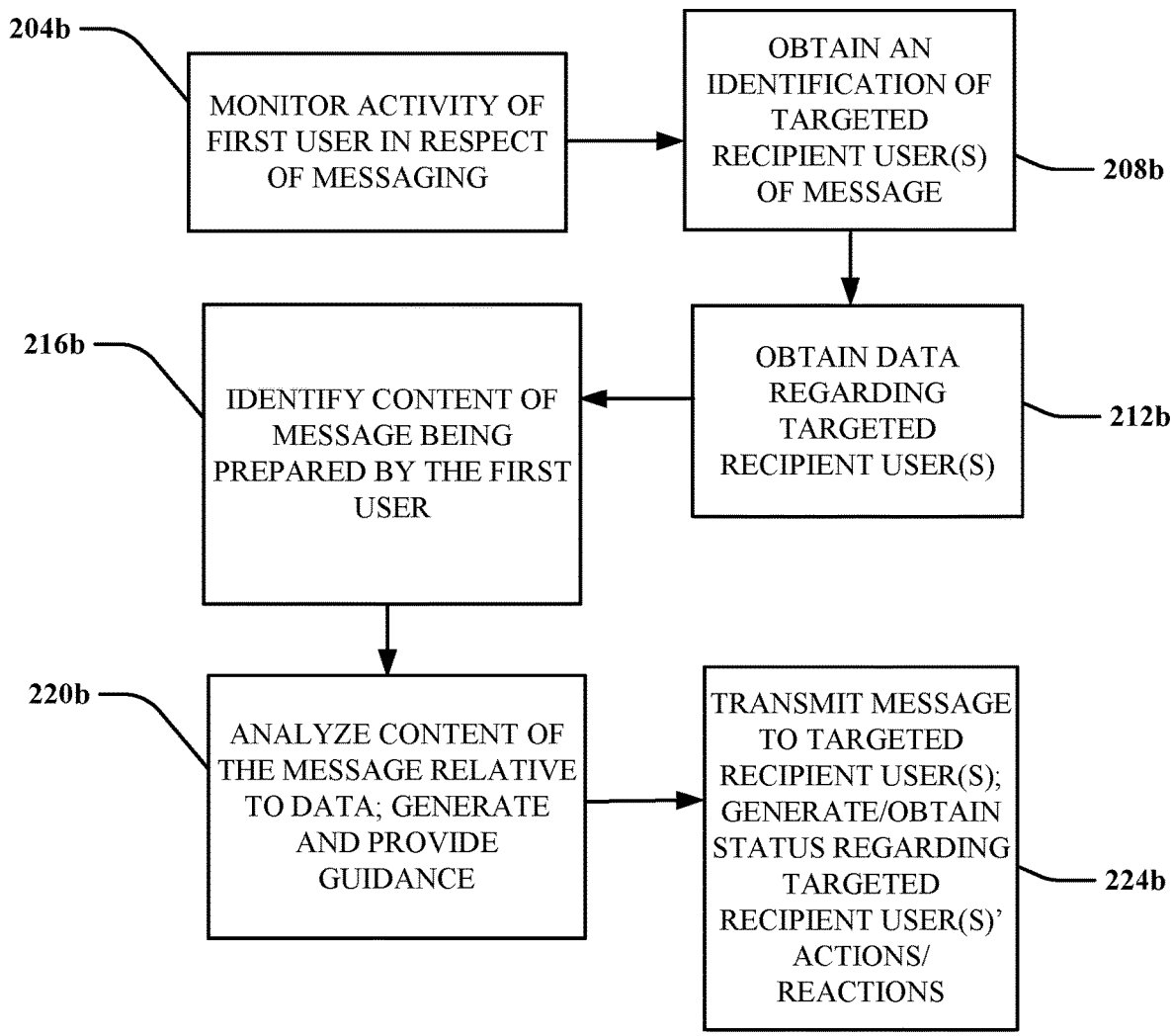
FIG. 2B depicts an illustrative embodiment of a method in accordance with various aspects described herein.

Referring now to FIG. 2B, an illustrative embodiment of a method 200b in accordance with various aspects described herein is shown. The method 200b may be implemented or executed, in whole or in part, in conjunction with one or more systems, devices, and/or components, such as for example the systems, devices, and components set forth herein. Various operations of the method 200b are described below in relation to the blocks of FIG. 2B. In some embodiments, the blocks or operations may be embodied as instructions that may be stored by/in a memory, a computer-readable storage medium, or the like. The instructions may be executed by one or more processing systems to facilitate the operations; each processing system may include one or more processors.

In block 204b, one or more applications may be used to monitor activity in respect of a first user. For example, the monitored activity may pertain to whether the first user is preparing or composing a message that is to be sent to one or more other users. Assuming that such activity is detected, flow may proceed from block 204b to block 208b.

In block 208b, an identification of the targeted recipient user(s) may be obtained. For example, if the message includes a 'to' field, a 'cc' field, a 'bcc' field, or the like, any identifiers entered into the fields may be analyzed to determine who the target(s) of the message is/are.

In block 212b, data regarding the targeted recipient user(s) may be obtained based on the identification of block 208b. For example, the data may be obtained from profiles for the targeted recipient user(s) (see, e.g., FIG. 2A: DB 222a-1). The data may pertain to one or more prior messages between the first user and one or more of the targeted recipient user(s) and/or one or more prior messages between two or more of the target recipient user(s) (see, e.g., FIG. 2A: DB 222a-2). The data may pertain to/describe a use of an application by the targeted recipient user(s).

In block 216b, content of the (current) message being prepared/composed by the first user may be identified/determined. For example, natural language processing techniques, utilizations of dictionaries or thesauruses, etc., may be employed as part of block 216b to identify what the first user is intending to convey to the targeted recipient user(s).

In block 220b, an analysis of the content of the message (as identified/determined in block 216b) may be undertaken relative to the data of block 212b. The analysis may result in guidance that may be provided to the first user (or, analogously, a communication device of the first user). For example, and assuming that the data of block 212b indicates patterns or trends on the part of the targeted recipient user(s) that depart from the content of the current message being prepared by the first user, the guidance may include a recommended action directed to the first user for modifying the content. In some embodiments, one or more thresholds may be used to determine whether, and to what extent, the first user should be provided with guidance. For example, if the content of the message being prepared by the first user is generally aligned with the preferences or expectations of the targeted recipient user(s), it might not be worth it to annoy the first user for relatively minor departures/differences. On the other hand, if the content of the message being prepared by the first user is (grossly) misaligned with the preferences or expectations of the targeted recipient user(s), the first user may be required to take additional steps before being allowed/permitted to send the message (in order to protect the first user).

In block 224b, the message prepared by the first user (as potentially subject to modification in accordance with any guidance that may be generated as part of block 220b) may be transmitted to the targeted recipient user(s) (or associated communication devices). As part of block 224b, status may be generated regarding the targeted recipient user(s)' reactions or actions in respect of the message (or lack of reactions or actions). The status may be conveyed/provided to the first user and/or may be saved/stored as part of one or more profiles or logs/catalogs to facilitate future use/analysis.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of this disclosure may be applied in respect of various types or kinds of communication devices. For example, a UE may correspond to a mobile device such as a smartphone, a tablet, a laptop, etc., a headset, smart glasses, a personal computer (PC), etc. The functionality described herein may be embodied or implemented using hardware, software, firmware, or any combination thereof.

As set forth herein, aspects of this disclosure may facilitate a monitoring of messaging between two or more users (or, analogously, two or more communication devices). The monitoring may be performed in real-time (or in near real-time) to generate and provide guidance to a first user regarding how a message intended for at least a second user may be received by the at least a second user. The guidance may include recommendations or suggestions for improving or enhancing the effectiveness of the content of the message in relation to the at least a second user. Such guidance may be provided to the first user prior to the message being sent to the at least a second user and/or after the message has been sent to the at least a second user.

As described above, in some embodiments changes in applications that are active on a communication device may warrant additional steps to be taken to ensure that a user of the communication device tailors the content of her behaviors or communications to an environment associated with an active application. Such additional steps may serve to safeguard a first user and/or one or more additional users from inappropriate content.

As described herein, aspects of this disclosure are directed to numerous practical applications. For example, such practical applications may encompass a monitoring device or monitoring technique that may serve to: warn a first user or modify a content of a message that the first user intends to send to one or more targeted recipient users. Aspects of this disclosure may enhance an effectiveness and efficiency of communications between users, which may alleviate or remove a need on the part of users to send follow-up, clarifying messages. Thus, users might not be burdened by having to engage in unnecessary/unproductive communications, which may also provide a benefit in terms of reducing traffic in a communication network or system (thereby potentially freeing up communication resources of the communication network/system for other uses/purposes). Accordingly, the technical features of this disclosure are indicative of substantial improvements relative to conventional techniques. Suffice it to say, aspects of this disclosure are not directed to abstract ideas. To the contrary, and as one skilled in the art will appreciate based on a review of this disclosure, the various aspects of this disclosure are directed to, and encompass, significantly more than any abstract idea standing alone.

Figure 3:
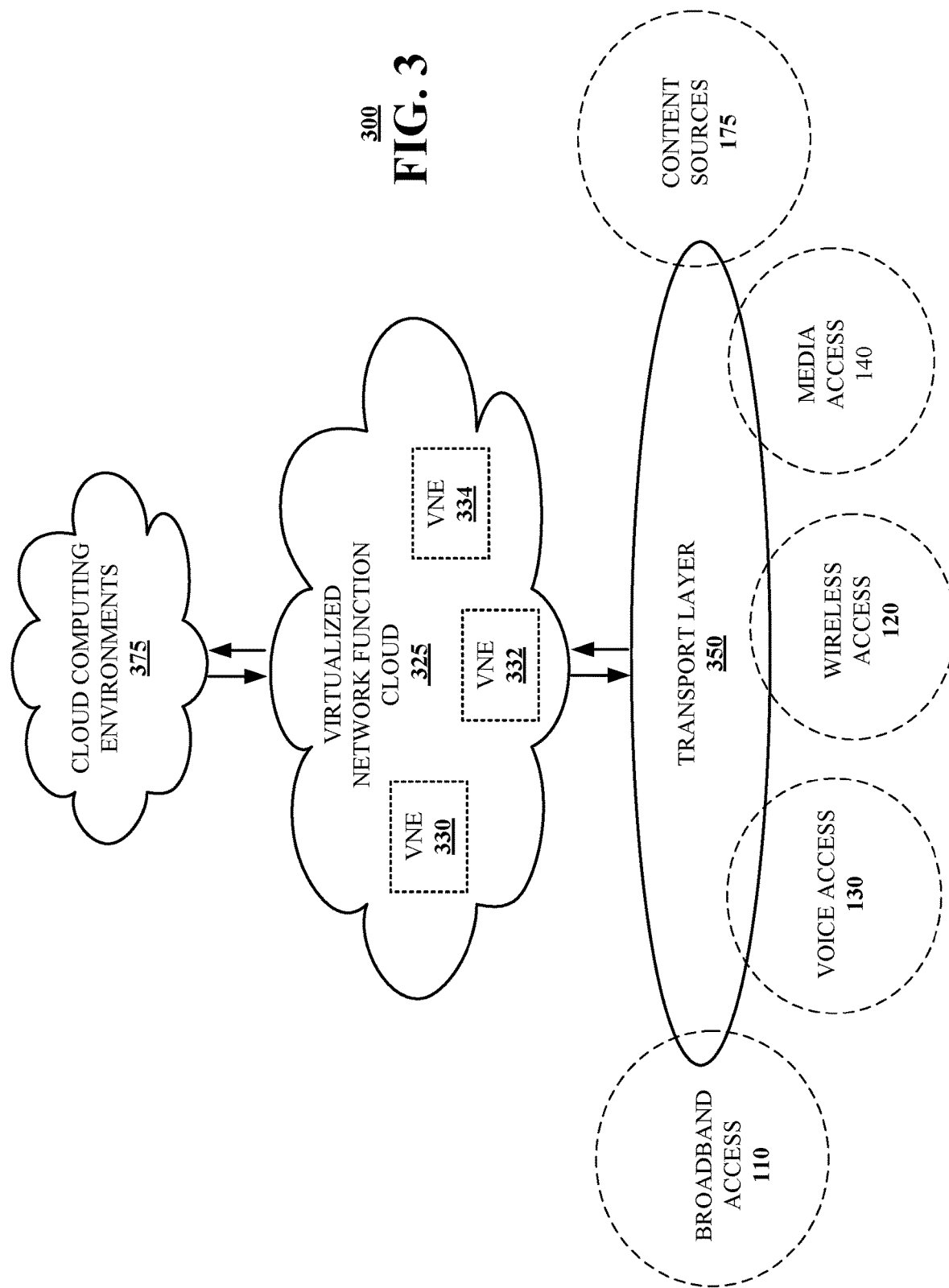
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, and method 200b presented in FIGS. 1, 2A, and 2B. For example, the virtualized communication network 300 can facilitate in whole or in part determining that a first user is composing a first message in a first application, the composing including a generation or an incorporation of first content, based on the determining, identifying a second user that is targeted as a recipient of the first message, obtaining, based on the identifying of the second user, first data pertaining to the second user, analyzing the first content relative to at least the first data, and providing, based on the analyzing, guidance to the first user. The virtualized communication network 300 can facilitate in whole or in part identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. The virtualized communication network 300 can facilitate in whole or in part determining, by a processing system including a processor, that a first user has requested a monitoring of messages sent via a first application, resulting in a first determination, determining, by the processing system, that the first user has composed a first message in the first application, resulting in a second determination, analyzing, by the processing system and based on the first determination and the second determination, a first content of the first message in accordance with a preference of a second user, providing, by the processing system and based on the analyzing, guidance to the first user via the first application, transmitting, by the processing system, the first message to the second user via the first application in accordance with the guidance, determining, by the processing system, that the first user has disabled a monitoring of messages sent via a second application that is different from the first application, resulting in a third determination, determining, by the processing system, that the first user has composed a second message in the second application, resulting in a fourth determination, and transmitting, by the processing system and based on the third determination and the fourth determination, the second message to the second user via the second application without providing guidance to the first user in the second application, wherein a second content of the second message is inconsistent with the preference of the second user.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
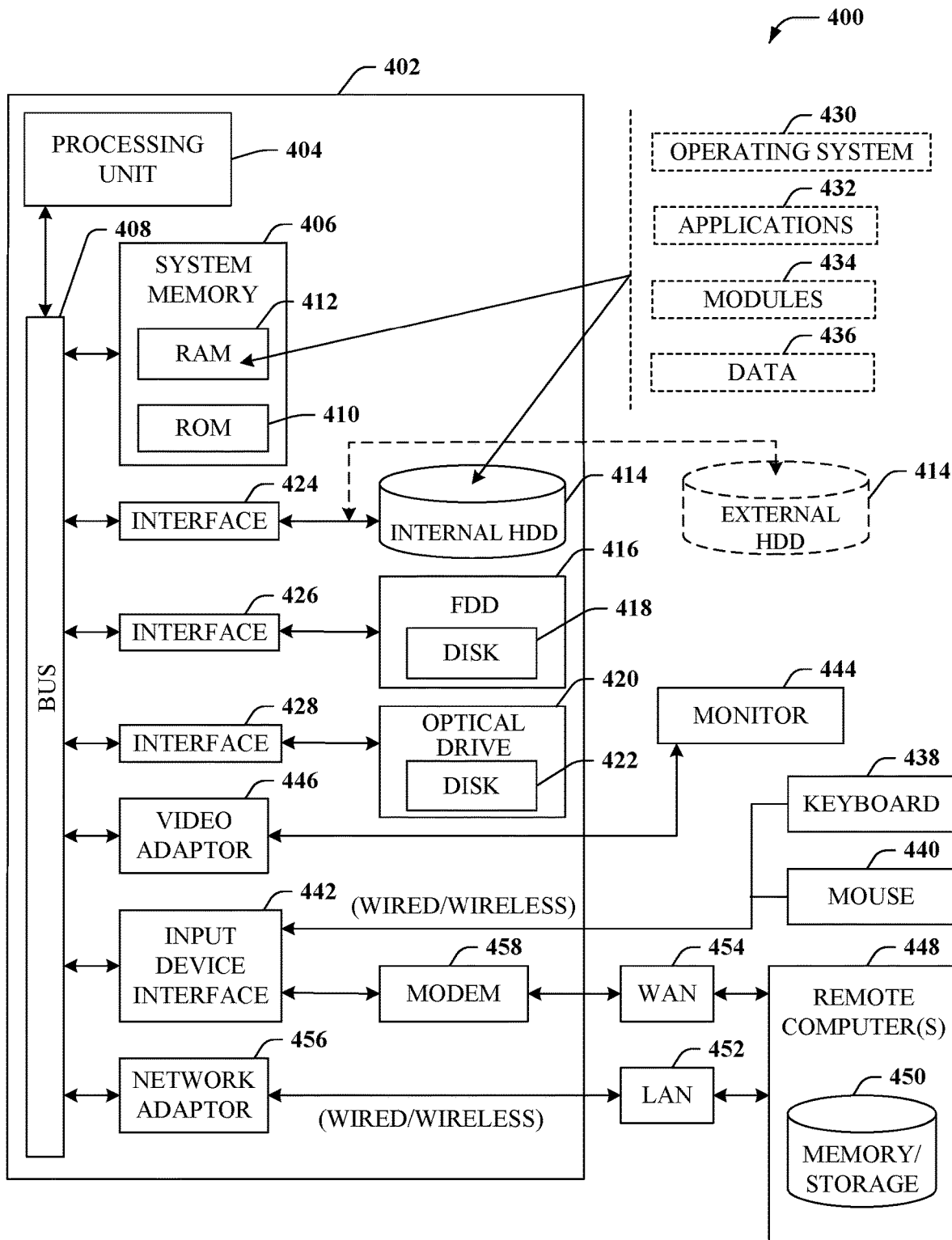
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate in whole or in part determining that a first user is composing a first message in a first application, the composing including a generation or an incorporation of first content, based on the determining, identifying a second user that is targeted as a recipient of the first message, obtaining, based on the identifying of the second user, first data pertaining to the second user, analyzing the first content relative to at least the first data, and providing, based on the analyzing, guidance to the first user. The computing environment 400 can facilitate in whole or in part identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. The computing environment 400 can facilitate in whole or in part determining, by a processing system including a processor, that a first user has requested a monitoring of messages sent via a first application, resulting in a first determination, determining, by the processing system, that the first user has composed a first message in the first application, resulting in a second determination, analyzing, by the processing system and based on the first determination and the second determination, a first content of the first message in accordance with a preference of a second user, providing, by the processing system and based on the analyzing, guidance to the first user via the first application, transmitting, by the processing system, the first message to the second user via the first application in accordance with the guidance, determining, by the processing system, that the first user has disabled a monitoring of messages sent via a second application that is different from the first application, resulting in a third determination, determining, by the processing system, that the first user has composed a second message in the second application, resulting in a fourth determination, and transmitting, by the processing system and based on the third determination and the fourth determination, the second message to the second user via the second application without providing guidance to the first user in the second application, wherein a second content of the second message is inconsistent with the preference of the second user.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
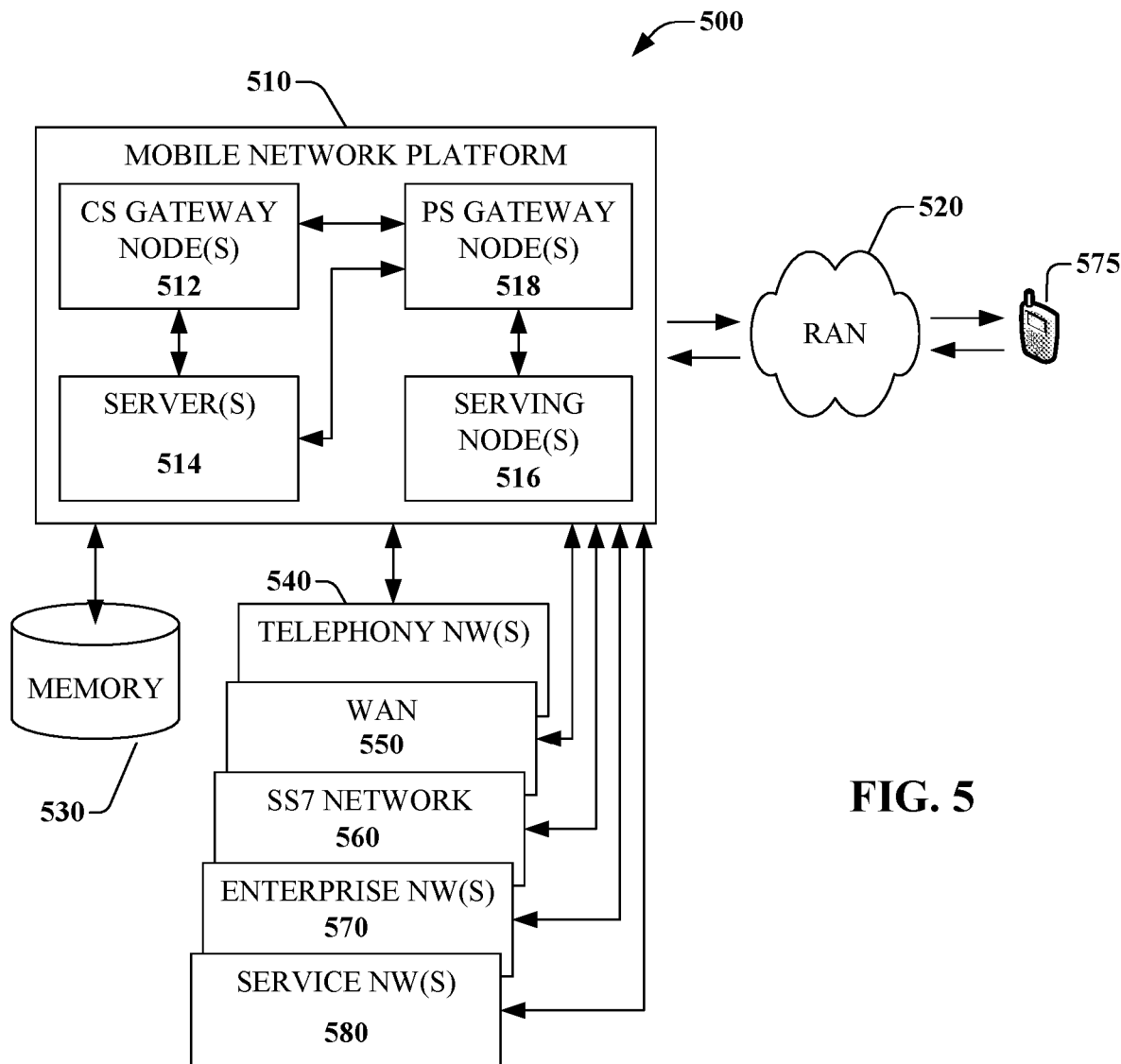
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate in whole or in part determining that a first user is composing a first message in a first application, the composing including a generation or an incorporation of first content, based on the determining, identifying a second user that is targeted as a recipient of the first message, obtaining, based on the identifying of the second user, first data pertaining to the second user, analyzing the first content relative to at least the first data, and providing, based on the analyzing, guidance to the first user. The platform 510 can facilitate in whole or in part identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. The platform 510 can facilitate in whole or in part determining, by a processing system including a processor, that a first user has requested a monitoring of messages sent via a first application, resulting in a first determination, determining, by the processing system, that the first user has composed a first message in the first application, resulting in a second determination, analyzing, by the processing system and based on the first determination and the second determination, a first content of the first message in accordance with a preference of a second user, providing, by the processing system and based on the analyzing, guidance to the first user via the first application, transmitting, by the processing system, the first message to the second user via the first application in accordance with the guidance, determining, by the processing system, that the first user has disabled a monitoring of messages sent via a second application that is different from the first application, resulting in a third determination, determining, by the processing system, that the first user has composed a second message in the second application, resulting in a fourth determination, and transmitting, by the processing system and based on the third determination and the fourth determination, the second message to the second user via the second application without providing guidance to the first user in the second application, wherein a second content of the second message is inconsistent with the preference of the second user.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
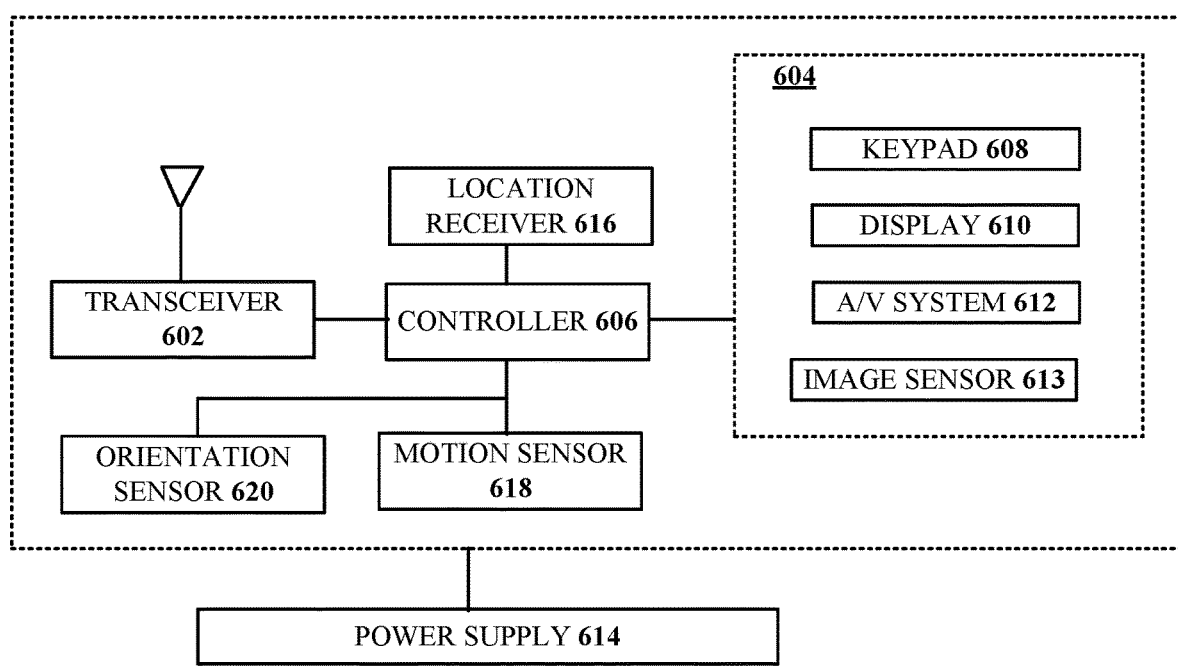
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 can facilitate in whole or in part determining that a first user is composing a first message in a first application, the composing including a generation or an incorporation of first content, based on the determining, identifying a second user that is targeted as a recipient of the first message, obtaining, based on the identifying of the second user, first data pertaining to the second user, analyzing the first content relative to at least the first data, and providing, based on the analyzing, guidance to the first user. The computing device 600 can facilitate in whole or in part identifying a first message composed by a first user on a first user equipment that is directed to a second user of a second user equipment, identifying a preference of the second user, determining that a first content of the first message composed by the first user departs from the preference of the second user in an amount greater than a threshold, and providing, based on the determining, guidance to the first user for modifying the first content to generate second content that more closely aligns to the preference of the second user. The computing device 600 can facilitate in whole or in part determining, by a processing system including a processor, that a first user has requested a monitoring of messages sent via a first application, resulting in a first determination, determining, by the processing system, that the first user has composed a first message in the first application, resulting in a second determination, analyzing, by the processing system and based on the first determination and the second determination, a first content of the first message in accordance with a preference of a second user, providing, by the processing system and based on the analyzing, guidance to the first user via the first application, transmitting, by the processing system, the first message to the second user via the first application in accordance with the guidance, determining, by the processing system, that the first user has disabled a monitoring of messages sent via a second application that is different from the first application, resulting in a third determination, determining, by the processing system, that the first user has composed a second message in the second application, resulting in a fourth determination, and transmitting, by the processing system and based on the third determination and the fourth determination, the second message to the second user via the second application without providing guidance to the first user in the second application, wherein a second content of the second message is inconsistent with the preference of the second user.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining that a first user is composing a first message in a first application, the composing including a generation or an incorporation of first content;
based on the determining, identifying a second user that is targeted as a recipient of the first message;
obtaining, based on the identifying of the second user, first data pertaining to the second user;
analyzing the first content relative to at least the first data;
providing, based on the analyzing, guidance to the first user, wherein the guidance comprises a recommendation regarding a modification of the first content of the first message and the guidance includes an identification of a reason why the recommendation is being provided in respect of the second user;
obtaining an indication that the first user accepts at least a portion of the recommendation;
incorporating, based on the obtaining of the indication, second content as part of the first message, the second content being different from the first content;
transmitting, based on the incorporating, the first message to a communication device of the second user, resulting in a transmitted first message; and
identifying, based on the transmitting of the first message, a reaction of the second user to the transmitted first message, resulting in an identified reaction, wherein the identified reaction includes: a tone of voice of the second user, a body posture of the second user, a first action on the part of the second user relative to a first timeout, and a lack of a second action on the part of the second user relative to a second timeout.

2. The device of claim 1, wherein the first data pertains to a second message involving the first user and the second user.

3. The device of claim 2, wherein the second message was conveyed in a second application that is different from the first application prior to the first user composing the first message in the first application.

4. The device of claim 1, wherein the first data pertains to a use of a messaging application by the second user.

5. The device of claim 4, wherein the messaging application is different from the first application.

6. The device of claim 1, wherein the guidance comprises a recommended action.

7. The device of claim 1, wherein the transmitted first message omits the first content.

8. The device of claim 1, wherein the operations further comprise:
generating or modifying a profile for the second user to incorporate the identified reaction.

9. The device of claim 1, wherein the operations further comprise:
transmitting an indication of the identified reaction to a communication device of the first user.

10. The device of claim 1, wherein the operations further comprise:
based on the determining, identifying a third user that is targeted as a recipient of the first message; and
obtaining, based on the identifying of the third user, second data pertaining to the third user,
wherein the analyzing of the first content of the first message relative to at least the first data comprises analyzing the first content of the first message relative to the second data.

11. The device of claim 1, wherein the operations further comprise:
determining that the first user exited a second application and activated the first application on a communication device of the first user within a threshold amount of time,
wherein the guidance is based on the determining that the first user exited the second application and activated the first application on the communication device within the threshold amount of time.

12. The device of claim 11, wherein the second application facilitates a playing of a video game, and wherein the first application facilitates a videoconference.

13. A non-transitory machine-readable medium, comprising executable instructions that, when executed by a processing system including a processor, facilitate performance of operations, the operations comprising:

identifying a first message composed by a first user on a first user equipment that is directed to a second user of a second user equipment;

identifying a preference of the second user;

determining that a first content of the first message composed by the first user departs from the preference of the second user in an amount greater than a threshold;

providing, based on the determining, guidance to the first user for modifying the first content to generate second content that more closely aligns to the preference of the second user, wherein the guidance includes an identification of a reason why the first content departs from the preference of the second user in the amount greater than the threshold;

obtaining, based on the providing, an acceptance from the first user for modifying the first content to generate the second content;

transmitting the second content as part of the first message to the second user equipment; and obtaining an indication of a response or a reaction of the second user to the second content, wherein the indication of the response or the reaction of the second user includes: a tone of voice of the second user, a body posture of the second user, a first action on the part of the second user relative to a first timeout, and a lack of a second action on the part of the second user relative to a second timeout.

14. The non-transitory machine-readable medium of claim 13, wherein the operations further comprise:

providing the indication to the first user equipment.

15. The non-transitory machine-readable medium of claim 14, wherein the obtaining of the indication is based on a use of a camera, a microphone, or a combination thereof.

16. A method, comprising:

determining, by a processing system including a processor, that a first user has requested a monitoring of messages sent via a first application, resulting in a first determination;

determining, by the processing system, that the first user has composed a first message in the first application, resulting in a second determination;

analyzing, by the processing system and based on the first determination and the second determination, a first content of the first message in accordance with a preference of a second user;

providing, by the processing system and based on the analyzing, guidance to the first user via the first application for modifying the first content of the first message to second content that is different from the first content, wherein the guidance includes an identification of a reason why the first content departs from the preference of the second user in an amount greater than a threshold, and wherein the second content more closely corresponds to the preference of the second user relative to the first content;

transmitting, by the processing system, the first message to the second user via the first application in accordance with the guidance, resulting in a transmitted first message, wherein the transmitted first message includes the second content and omits the first content;

obtaining, by the processing system and based on the transmitting of the first message to the second user, an indication of a response or a reaction of the second user to the second content, wherein the indication of the response or the reaction of the second user includes: a tone of voice of the second user, a body posture of the second user, a first action on the part of the second user relative to a first timeout, and a lack of a second action on the part of the second user relative to a second timeout;

determining, by the processing system, that the first user has disabled a monitoring of messages sent via a second application that is different from the first application, resulting in a third determination;

determining, by the processing system, that the first user has composed a second message in the second application, resulting in a fourth determination; and transmitting, by the processing system and based on the third determination and the fourth determination, the second message to the second user via the second application without providing guidance to the first user in the second application, wherein a third content of the second message is inconsistent with the preference of the second user.

17. The method of claim 16, wherein the first content includes a criticism.

18. The method of claim 17, wherein the criticism is of a third user.

19. The method of claim 16, wherein the analyzing comprises determining that the second user is identified in a 'cc' field of the first message.

20. The method of claim 16, wherein the analyzing comprises determining that the second user is identified in a 'bcc' field of the first message.

* * * * *